United States Patent
Hsu et al.

(10) Patent No.: US 10,944,151 B2
(45) Date of Patent: Mar. 9, 2021

(54) ANTENNA STRUCTURE AND WIRELESS COMMUNICATION DEVICE USING SAME

(71) Applicant: Chiun Mai Communication Systems, Inc., New Taipei (TW)

(72) Inventors: Wen-Chang Hsu, New Taipei (TW);
Shu-Wei Jhang, New Taipei (TW);
Jia-Hung Hsiao, New Taipei (TW);
Tun-Yuan Tsou, New Taipei (TW);
Tze-Hsuan Chang, New Taipei (TW);
Yen-Jung Tseng, New Taipei (TW);
Yi-Ting Chen, New Taipei (TW);
Jung-Sheng Chih, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 299 days.

(21) Appl. No.: 15/881,864

(22) Filed: Jan. 29, 2018

(65) Prior Publication Data
US 2018/0248250 A1 Aug. 30, 2018

Related U.S. Application Data

(60) Provisional application No. 62/462,941, filed on Feb. 24, 2017.

(30) Foreign Application Priority Data

Oct. 31, 2017 (CN) .......................... 201711049796.X

(51) Int. Cl.
*H01Q 1/24* (2006.01)
*H04M 1/02* (2006.01)
*H01Q 13/10* (2006.01)
*H01Q 5/35* (2015.01)
*H01Q 5/378* (2015.01)
(Continued)

(52) U.S. Cl.
CPC .............. *H01Q 1/243* (2013.01); *H01Q 5/35* (2015.01); *H01Q 5/371* (2015.01); *H01Q 5/378* (2015.01);
(Continued)

(58) Field of Classification Search
CPC .......... H01Q 1/243; H01Q 21/28; H01Q 9/42; H01Q 9/30; H01Q 5/371; H01Q 5/378;
(Continued)

(56) References Cited

U.S. PATENT DOCUMENTS 8,766,859 B2 7/2014 Merz et al.
2013/0016013 A1\* 1/2013 Wong ....................... H01Q 1/38
343/700 MS (Continued)

FOREIGN PATENT DOCUMENTS

| CN | 105281020 A | 1/2016 |
|---|---|---|
| CN | 105762515 A | 7/2016 |
| CN | 205960191 U | 2/2017 |

*Primary Examiner* — Dimary S Lopez Cruz
*Assistant Examiner* — Bamidele A Jegede
(74) *Attorney, Agent, or Firm* — ScienBiziP, P.C.

(57) ABSTRACT

An antenna structure includes a housing, a first feed source, a ground portion, a radiator, and a second feed source. The housing includes a front frame, a backboard, and a side frame. The side frame defines a slot. The front frame defines a first gap, a second gap, and a groove. A radiating portion and a coupling portion are divided from the housing by the slot, the first gap, the second gap, and the groove. The first feed source is electrically connected to the radiating portion. One end of the ground portion is electrically connected to the radiating portion and another end of the ground portion is grounded. The radiator is coupled with and apart from the coupling portion. The second feed source is electrically connected to the radiator and a current from the second feed source is coupled to the coupling portion through the radiator.

18 Claims, 8 Drawing Sheets

(51) Int. Cl.
*H01Q 5/371* (2015.01)
*H01Q 9/30* (2006.01)
*H01Q 9/42* (2006.01)
*H01Q 21/28* (2006.01)
*H01Q 5/335* (2015.01)

(52) U.S. Cl.
CPC ................ *H01Q 9/30* (2013.01); *H01Q 9/42* (2013.01); *H01Q 13/10* (2013.01); *H01Q 21/28* (2013.01); *H04M 1/0283* (2013.01); *H01Q 5/335* (2015.01)

(58) Field of Classification Search
CPC .......... H01Q 5/35; H01Q 13/10; H01Q 5/335; H04M 1/0283
See application file for complete search history.

(56) References Cited

U.S. PATENT DOCUMENTS

| | | | | |
|---|---|---|---|---|
| 2014/0292584 A1* | 10/2014 | Lin | ........................ | H01Q 1/243 343/700 MS |
| 2014/0320349 A1* | 10/2014 | Lee | ........................ | H01Q 5/392 343/700 MS |
| 2014/0347227 A1* | 11/2014 | Iellici | ..................... | H01Q 1/243 343/702 |
| 2014/0354508 A1* | 12/2014 | Lee | ........................ | H01Q 5/371 343/860 |
| 2015/0123857 A1* | 5/2015 | Park | ........................ | H01Q 1/243 343/702 |
| 2015/0123871 A1* | 5/2015 | Chang | .................... | H01Q 1/243 343/872 |
| 2015/0188212 A1* | 7/2015 | Tseng | ..................... | H01Q 21/28 343/702 |
| 2016/0050302 A1* | 2/2016 | Lee | ........................ | H04M 1/185 455/575.1 |
| 2016/0164192 A1* | 6/2016 | Lin | ........................ | H01Q 21/30 343/749 |
| 2016/0344439 A1* | 11/2016 | Seol | ...................... | G06F 1/1656 |
| 2017/0047639 A1* | 2/2017 | Lee | ........................ | H01Q 1/243 |
| 2017/0162933 A1* | 6/2017 | Xiong | .................... | H01Q 1/521 |
| 2017/0201010 A1* | 7/2017 | Kim | ........................ | H01Q 9/42 |
| 2017/0244818 A1* | 8/2017 | Kim | ........................ | H01Q 5/335 |
| 2017/0324149 A1* | 11/2017 | Chiang | .................. | H01Q 5/328 |
| 2017/0338545 A1* | 11/2017 | Guo | ........................ | H01Q 1/243 |
| 2018/0026343 A1 | 1/2018 | Lee et al. | | |

\* cited by examiner

ANTENNA STRUCTURE AND WIRELESS COMMUNICATION DEVICE USING SAME

CROSS-REFERENCE TO RELATED APPLICATIONS

This application claims priority to Chinese Patent Application No. 201711049796.X filed on Oct. 31, 2017, and claims priority to U.S. Patent Application No. 62/462,941 filed on Feb. 24, 2017, the contents of which are incorporated by reference herein.

FIELD

The subject matter herein generally relates to an antenna structure and a wireless communication device using the antenna structure.

BACKGROUND

Metal housings, for example, metallic backboards, are widely used for wireless communication devices, such as mobile phones or personal digital assistants (PDAs). Antennas are also important components in wireless communication devices for receiving and transmitting wireless signals at different frequencies, such as signals in Long Term Evolution Advanced (LTE-A) frequency bands. However, when the antenna is located in the metal housing, the antenna signals are often shielded by the metal housing. This can degrade the operation of the wireless communication device. Additionally, the metallic backboard generally defines slots or/and gaps thereon, which will affect an integrity and an aesthetic quality of the metallic backboard.

BRIEF DESCRIPTION OF THE DRAWINGS

Implementations of the present technology will now be described, by way of example only, with reference to the attached figures.

DETAILED DESCRIPTION

Figure 1:
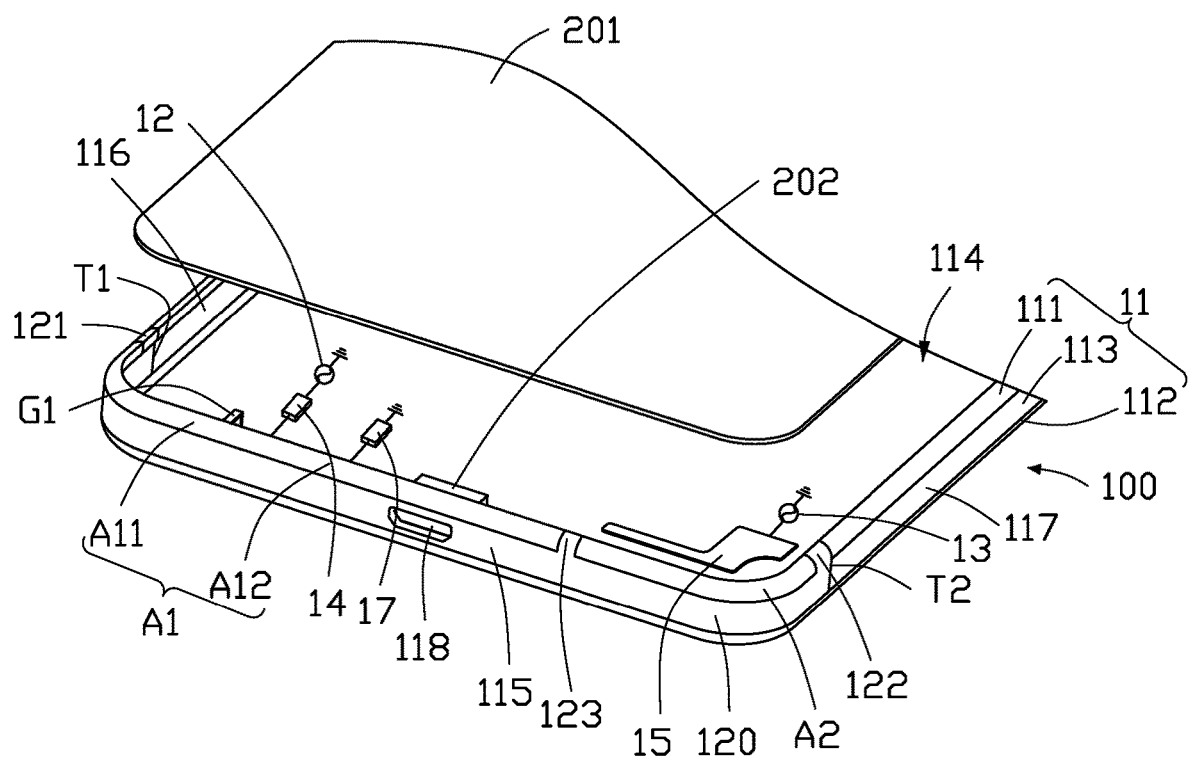
FIG. 1 is an isometric view of an exemplary embodiment of a wireless communication device using an exemplary antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using same.

Figure 2:
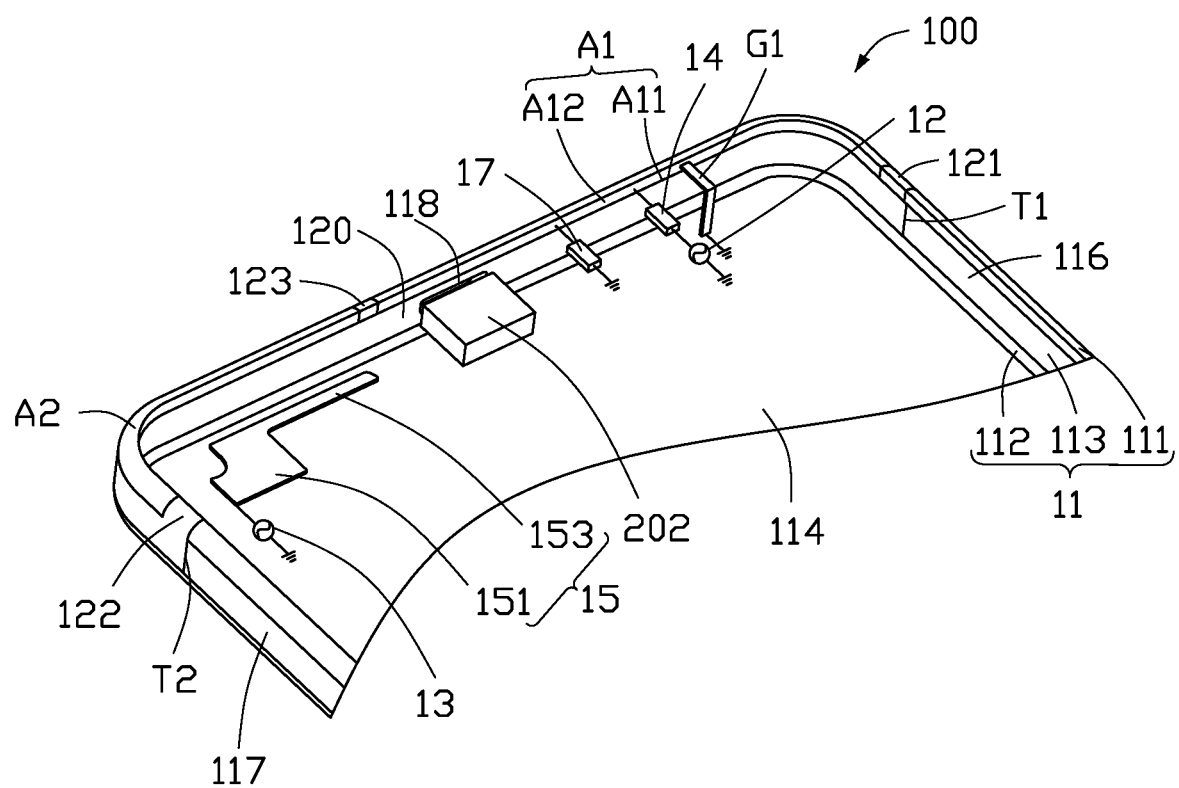
FIG. 2 is similar to FIG. 1, but shown from another angle.

FIG. 1 and FIG. 2 illustrate an embodiment of a wireless communication device 200 using an exemplary antenna structure 100. The wireless communication device 200 can be a mobile phone or a personal digital assistant, for example. The antenna structure 100 can receive and send wireless signals.

The antenna structure 100 includes a housing 11, a first feed source 12, a second feed source 13, a matching circuit 14, a ground portion G1, and a radiator 15.

The housing 11 can be a metal housing of the wireless communication device 200. In this exemplary embodiment, the housing 11 is made of metallic material. The housing 11 includes a front frame 111, a backboard 112, and a side frame 113. The front frame 111, the backboard 112, and the side frame 113 can be integral with each other. The front frame 111, the backboard 112, and the side frame 113 cooperatively form the housing of the wireless communication device 200.

The front frame 111 defines an opening (not shown). The wireless communication device 200 includes a display 201. The display 201 is received in the opening. The display 201 has a display surface. The display surface is exposed at the opening and is positioned parallel to the backboard 112.

The backboard 112 is positioned opposite to the front frame 111. The backboard 112 is directly connected to the side frame 113 and there is no gap between the backboard 112 and the side frame 113. The backboard 112 serves as the ground of the antenna structure 100.

The side frame 113 is positioned between the backboard 112 and the front frame 111. The side frame 113 is positioned around a periphery of the backboard 112 and a periphery of the front frame 111. The side frame 113 forms a receiving space 114 together with the display 201, the front frame 111, and the backboard 112. The receiving space 114 can receive a printed circuit board, a processing unit, or other electronic components or modules.

The side frame 113 includes an end portion 115, a first side portion 116, and a second side portion 117. In this exemplary embodiment, the end portion 115 can be a bottom portion of the wireless communication device 200. The end portion 115 connects the front frame 111 and the backboard 112. The first side portion 116 is positioned apart from the second side portion 117. The end portion 115 has first and second ends. The first side portion 116 is connected to the first end of the first frame 111 and the second side portion 117 is connected to the second end of the end portion 115. The first side portion 116 and the second side portion 117 both connect to the front frame 111 and the backboard 112.

The side frame 113 defines a through hole 118 and a slot 120. The front frame 111 defines a first gap 121, a second gap 122, and a groove 123. The through hole 118 is defined on the end portion 115.

Figure 3:
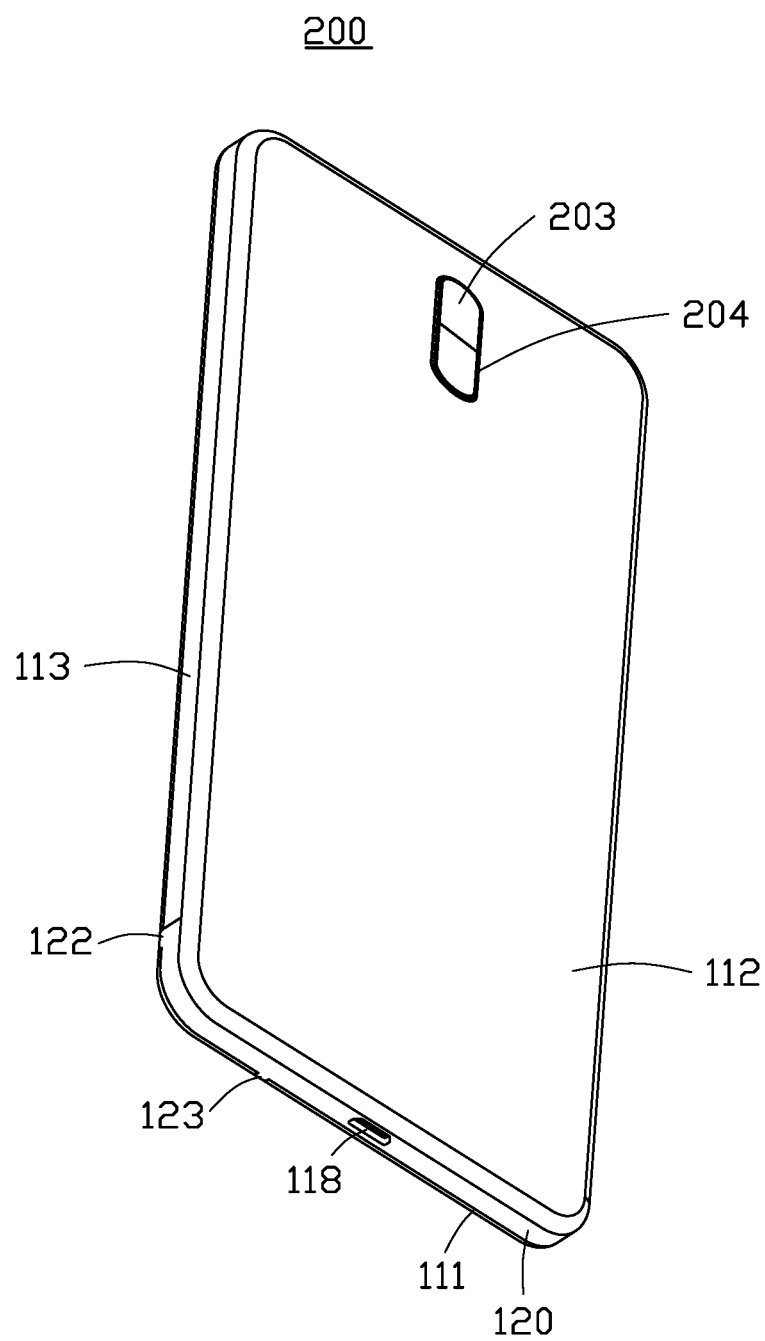
FIG. 3 is an assembled, isometric view of the wireless communication device of FIG. 1.

As illustrated in FIG. 2 and FIG. 3, the wireless communication device 200 includes at least one electronic element. In this exemplary embodiment, the wireless communication device 200 includes a first electronic element 202 and a second electronic element 203 (shown in FIG. 3). In this exemplary embodiment, the first electronic element 202 is a Universal Serial Bus (USB) module. The first electronic element 202 is positioned in the receiving space 114. The first electronic element 202 corresponds to the through hole 118 and is partially exposed from the through hole 118. A USB device can be inserted in the through hole 118 and be electrically connected to the first electronic element 202. The second electronic element 203 is a rear double-camera module.

In this exemplary embodiment, the backboard 112 is an integral and single metallic sheet. Except for a hole 204 exposing the rear double-camera module (i.e., the second electronic element 203), the backboard 112 does not define any other slot, break line, and/or gap.

In this exemplary embodiment, the slot 120 is defined at the end portion 115 and communicates with the through hole 118. The slot 120 further extends to the first side portion 116 and the second portion 117. The first gap 121, the second gap 122, and the groove 123 all communicate with the slot 120 and extend across the front frame 111. In this exemplary embodiment, the first gap 121 is defined on the front frame 111 and communicates with a first end T1 of the slot 120 positioned on the first side portion 116. The second gap 122 is defined on the front frame 111 and communicates with a second end T2 of the slot 120 positioned on the second side portion 117. The groove 123 is positioned on the end portion 115. The groove 123 is positioned between the first end T1 and the second end T2, and communicates with the slot 120.

Two portions are divided from the housing 11 by the slot 120, the first gap 121, the second gap 122, and the groove 123. The two portions are a radiating portion A1 and a coupling portion A2. A first portion of the front frame 111 between the first gap 121 and the groove 123 forms the radiating portion A1. A second portion of the front frame 111 between the second gap 122 and the groove 123 forms the coupling portion A2. In this exemplary embodiment, the groove 123 is not positioned at a middle portion of the end portion 115. The radiating portion A1 is longer than the coupling portion A2.

In this exemplary embodiment, except the through hole 118, the slot 120, the first gap 121, the second gap 122, and the groove 123 are all filled with insulating material, for example, plastic, rubber, glass, wood, ceramic, or the like.

In this exemplary embodiment, the slot 120 is defined on the end of the side frame 113 adjacent to the backboard 112 and extends to the front frame 111. Then the radiating portion A1 and the coupling portion A2 are fully formed by a portion of the front frame 111. In other exemplary embodiments, a location of the slot 120 can be adjusted. For example, the slot 120 can be defined on the end of the side frame 113 adjacent to the backboard 112 and extends towards the front frame 111. Then the radiating portion A1 and the coupling portion A2 are formed by a portion of the front frame 111 and a portion of the side frame 113.

In other exemplary embodiments, the slot 120 is defined only at the end portion 115 and does not extend to any one of the first side portion 116 and the second portion 117. In other exemplary embodiments, the slot 120 can be defined at the end portion 115 and extend to one of the first side portion 116 and the second portion 117. Then, locations of the first end T1 and the second end T2 and locations of the first gap 121 and the second gap 122 can be adjusted according to a position of the slot 120. For example, one of the first end T1 and the second end T2 can be positioned at a location of the front frame 111 corresponding to the end portion 115. The other one of the first end T1 and the second end T2 is positioned at a location of the front frame 111 corresponding to the first side portion 116 or the second side portion 117. That is, a shape and a location of the slot 120, locations of the first end T1 and the second end T2 on the side frame 113 can be adjusted, to ensure that the radiating portion A1 and the coupling portion A2 can be divided from the housing 11 by the slot 120, the first gap 121, the second gap 122, and the groove 123.

In this exemplary embodiment, except for the through hole 118, the slot 120, the first gap 121, the second gap 122, and the groove 123, a lower half portion of the front frame 111 and the side frame 113 does not define any other slot, break line, and/or gap.

In this exemplary embodiment, the coupling portion A2 of the antenna structure 100 is grounded. One end of the coupling portion A2 adjacent to the second gap 122 can be electrically connected to the backboard 112 to be grounded, through a connecting structure, for example, a shrapnel, a probe, a conductive line, or the like. That is, the second gap 122 positioned at one side of the second side portion 117 is a virtual gap. Though the second coupling portion A2 is spaced apart from the backboard 112 through the second gap 122, actually, there is an electrical connection between the coupling portion A2 and the backboard 112 through the connecting structure.

The first feed source 12 is positioned inside of the receiving space 114. One end of the first feed source 12 is electrically connected to the radiating portion A1, through the matching circuit 14, to feed current to the radiating portion A1. Another end of the first feed source 12 is electrically connected to the backboard 112 to be grounded. In this exemplary embodiment, when the first feed source 12 supplies current, the current flows to the radiating portion A1 and respectively transmits to the first gap 121 and the groove 123. The radiating portion A1 is divided by the first feed source 12 into a first radiating section A11 towards the first gap 121 and a second radiating section A12 towards the groove 123. A first portion of the front frame 111 extending from the first feed source 12 to the first gap 121 forms the first radiating section A11. A second portion of the front frame 111 extending from the first feed source 12 to the groove 123 forms the second radiating section A12.

In this exemplary embodiment, the first feed source 12 is not positioned at a middle portion of the radiating portion A1. The second radiating section A12 is longer than the first radiating section A11. The first radiating section A11 activates a first operation mode for generating radiation signals in a first frequency band. The second radiating section A12 activates a second operation mode for generating radiation signals in a second frequency band. In this exemplary embodiment, the first operation mode is a Long Term Evolution Advanced (LTE-A) middle frequency operation mode. The second operation mode is an LTE-A low frequency operation mode. Frequencies of the first frequency band are higher than frequencies of the second frequency band. In this exemplary embodiment, the first frequency band is a frequency band of about 1710-2170 MHz. The second frequency band is a frequency band of about 699-960 MHz.

The ground portion G1 is positioned in the receiving space 114 between the first gap 121 and the first feed source 12. One end of the ground portion G1 is electrically connected to the first radiating section A11. Another end of the ground portion G1 is electrically connected to the backboard 112 for grounding the first radiating section A11.

In this exemplary embodiment, through adjusting positions of the ground portion G1 and the first feeding source 12, the frequencies of the second operation mode can be effectively adjusted. For example, when a distance between the ground portion G1 and the first feeding source 12 decreases, the frequency of the second frequency band is shifted downward. When the distance between the ground portion G1 and the first feeding source 12 is increased, the frequency of the second frequency band is shifted upward. In addition, through changing a length of the ground portion G1, that is, adjusting a grounding path length of the ground portion G1, the frequencies and an impedance matching of the second frequency band can be effectively adjusted.

In this exemplary embodiment, the radiator 15 is positioned in the receiving space 114. The radiator 15 is coupled with and apart from the coupling portion A2. The radiator 15 can be a flexible printed circuit (FPC) or can be formed through laser direct structuring (LDS). The radiator 15 is substantially an L-shaped sheet and includes a connecting section 151 and a coupling section 153. The connecting section 151 is substantially arced. One end of the connecting section 151 is electrically connected to the second feed source 13 for feeding current to the radiator 15. Another end of the connecting section 151 is grounded. The coupling section 153 is substantially rectangular. One end of the coupling section 153 is perpendicularly connected to the connecting section 151. Another end of the coupling section 153 extends along a direction parallel to the end portion 115 and towards the first side portion 116.

In this exemplary embodiment, the second feed source 13 and the radiator 15 cooperatively form a monopole antenna. When the second feed source 13 supplies current, the current flows to the radiator 15. The current is further coupled to the coupling portion A2 through the coupling section 153 and is grounded through the coupling portion A2. The second feed source 13, the radiator 15, and the coupling portion A2 cooperatively form a coupling-feed antenna. The coupling-feed antenna activates a third operation mode for generating radiation signals in a third frequency band. In this exemplary embodiment, the third operation mode is an LTE-A high frequency operation mode. Frequencies of the third frequency band are higher than frequencies of the second frequency band. In this exemplary embodiment, the third frequency band is a frequency band of about 2300-2690 MHz.

Figure 4:
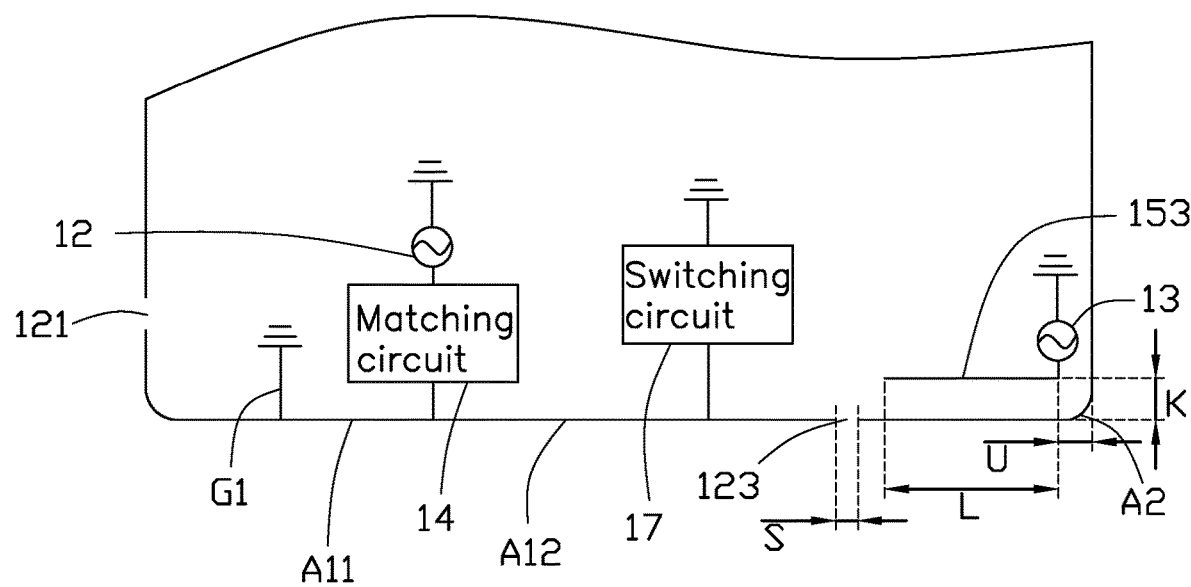
FIG. 4 is a circuit diagram of the antenna structure of FIG. 2.

As illustrated in FIG. 4, in this exemplary embodiment, a width of the groove 123 is set as S. A length of the coupling section 153 is set as L. A first distance between the coupling section 153 and a portion of the coupling portion A2 positioned at the end portion 115 is set as K. A second distance between the coupling section 153 and a portion of the coupling portion A2 positioned at the second side portion 117 is set as U. In this exemplary embodiment, parameters S and K respectively satisfy formula (1) and formula (2).

$$S \geq 0.5 \text{ mm} \quad (1)$$

$$0.5 \text{ mm} \leq K \leq 5 \text{ mm} \quad (2)$$

In this exemplary embodiment, the width S of the groove 123 is about 2 mm. The first distance K is about 1.5 mm. The second distance U is about 1 mm.

In this exemplary embodiment, through adjusting the length L of the coupling section 153 of the radiator 15, the frequency of the third frequency band of the antenna structure 100 can be effectively adjusted. In addition, through optimizing the first distance K, a wideband effect can be achieved, so that the high frequency band of the antenna structure 100 can cover 2300-2690 MHz.

As illustrated in FIG. 1, FIG. 2, and FIG. 4, in other exemplary embodiments, the antenna structure 100 further includes a switching circuit 17 for improving a bandwidth of the low frequency band of the second radiating section A12. The switching circuit 17 is positioned in the receiving space 114. One end of the switching circuit 17 is electrically connected to the second radiating section A12. Another end of the switching circuit 17 is electrically connected to the backboard 112 to be grounded.

Figure 5:
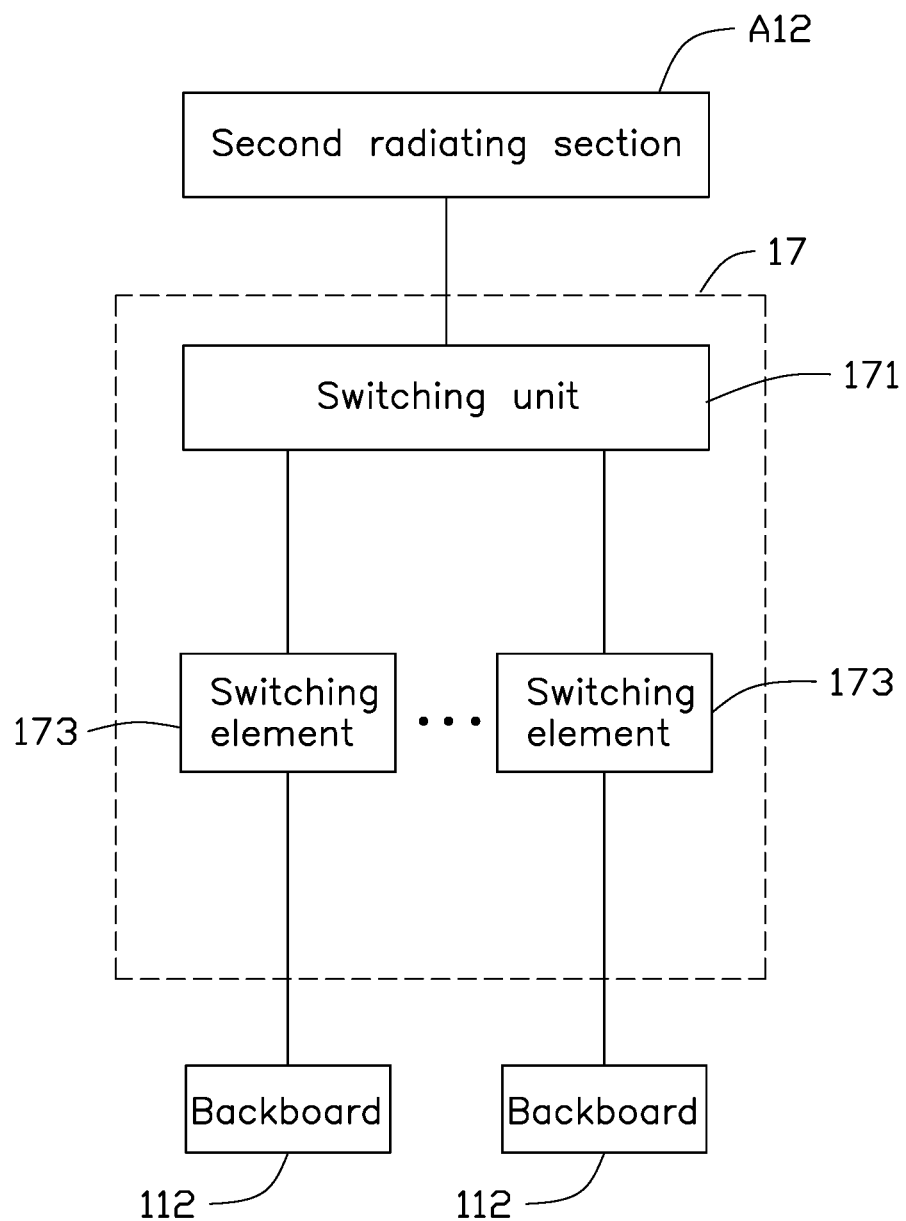
FIG. 5 is a circuit diagram of a switching circuit of the antenna structure of FIG. 4.

As illustrated in FIG. 5, the switching circuit 17 includes a switching unit 171 and a plurality of switching elements 173. The switching unit 171 is electrically connected to the second radiating section A12. The switching elements 173 can be an inductor, a capacitor, or a combination of the inductor and the capacitor. The switching elements 173 are connected in parallel to each other. One end of each switching element 173 is electrically connected to the switching unit 171. The other end of each switching element 173 is electrically grounded to the backboard 112 to be grounded.

Through control of the switching unit 171, the second radiating section A12 can be switched to connect with different switching elements 173. Since each switching element 173 has different impedance, frequencies of the LTE-A low frequency band of the second radiating section A12 can be adjusted.

For example, in this exemplary embodiment, the switching circuit 17 includes four switching elements 173, which are all inductors and have inductance values of about 6.2 nH, 20 nH, 100 nH, and 120 nH. When the switching unit 171 switches to connect with a switching element 173 having an inductance value of about 6.2 nH, the antenna structure 100 can work at frequency bands of GSM900 (880-960 MHz). When the switching unit 171 switches to connect with a switching element 173 having an inductance value of about 20 nH, the antenna structure 100 can work at a frequency band of LTE-A Band 20 (791-862 MHz). When the switching unit 171 switches to connect with a switching element 173 having an inductance value of about 100 nH and a switching element 173 having an inductance value of about 120 nH, the antenna structure 100 can work at a frequency band of LTE-A Band 28 (703-804 MHz). That is, through switching the switching unit 171, a low frequency band of the antenna structure 100 can cover 703-960 MHz.

Figure 6:
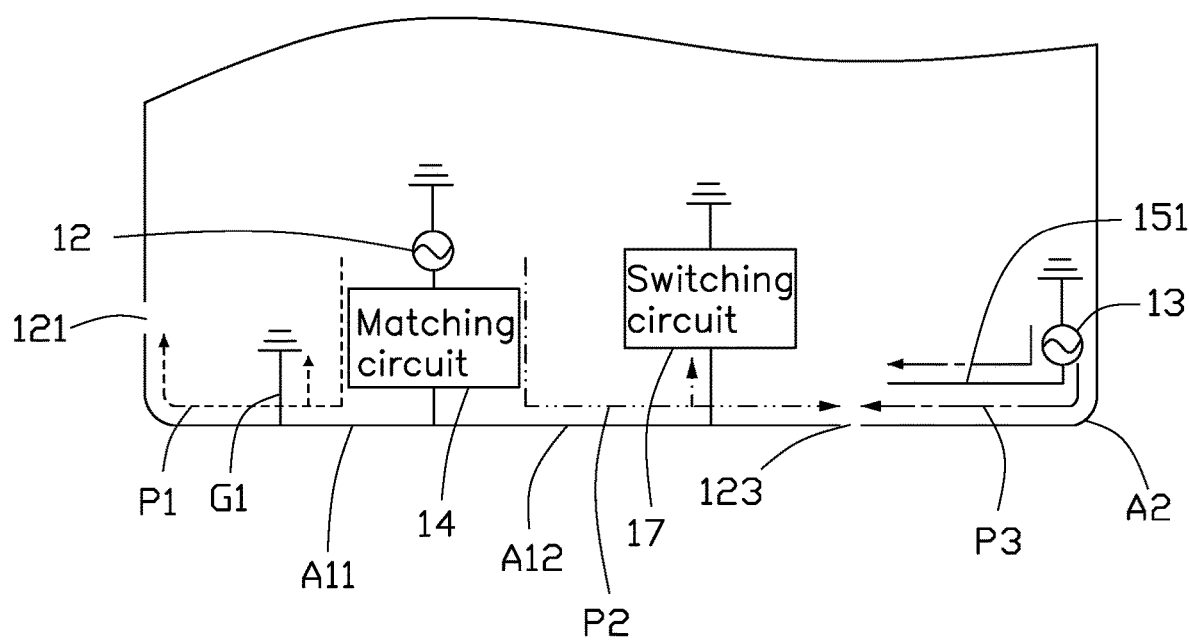
FIG. 6 is a current path distribution graph of the antenna structure of FIG. 4.

As illustrated in FIG. 6, when the first feed source 12 supplies current, the current flows through the first radiating section A11 and is grounded through the ground portion G1 (Per path P1). The first feed source 12, the first radiating section A11, and the ground portion G1 cooperatively form an inverted-F antenna to activate the first operation mode for generating radiation signals in the first frequency band. When the first feed source 12 supplies current, the current further flows through the second radiating section A12 and is grounded through the ground portion G1 (Per path P2). The first feed source 12, the second radiating section A12, and the switching circuit 17 cooperatively form an inverted-F antenna to activate the second operation mode for generating radiation signals in the second frequency band.

When the second feed source 13 supplies current, the current flows through the radiator 15 and is coupled to the coupling portion A2 (Per path P3). The second feed source 13, the radiator 15, and the coupling portion A2 cooperatively form a coupling-feed antenna to activate the third operation mode for generating radiation signals in the third frequency band.

In this exemplary embodiment, the backboard 112 can serve as the ground of the antenna structure 100 and the wireless communication device 200. In other exemplary embodiments, the wireless communication device 200 further includes a shielding mask or a middle frame (not shown). The shielding mask is positioned at the surface of the display 201 towards the backboard 111 and shields against electromagnetic interference. The middle frame is positioned at the surface of the display 201 towards the backboard 112 and supports the display 201. The shielding mask or the middle frame is made of metallic material. The shielding mask or the middle frame can connect the backboard 112 to serve as the ground of the antenna structure 100 and the wireless communication device 200. In above ground, the backboard 112 can be replaced by the shielding mask or the middle frame. In other exemplary embodiment, a circuit board of the wireless communication device 200 can includes a ground plane. In each ground, the ground plane can replace the backboard 112 to ground the antenna structure 100 and the wireless communication device 200. The ground plane can be electrically connected to the shielding mask, the middle frame, and the backboard 112.

Figure 7:
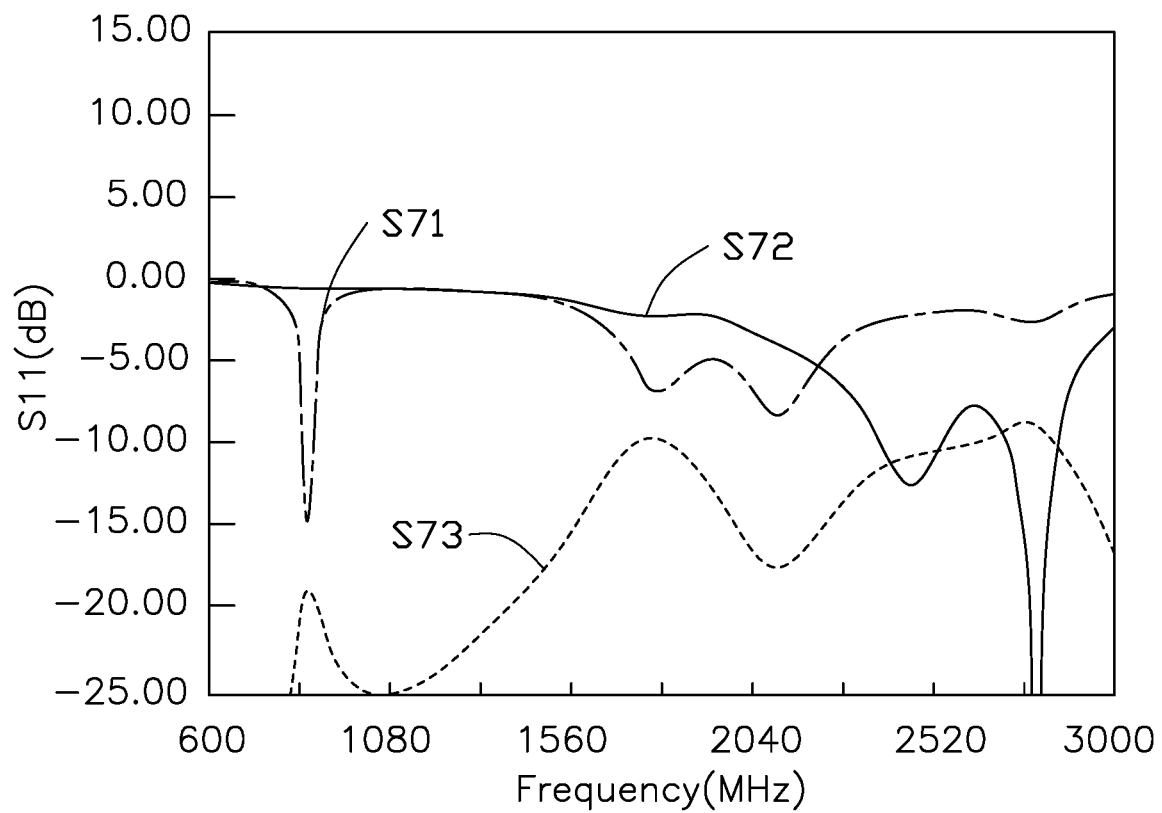
FIG. 7 is a scattering parameter graph of the antenna structure of FIG. 1.

FIG. 7 illustrates a scattering parameter graph of the antenna structure 100. Curve 71 illustrates a scattering parameter when the antenna structure 100 works at the LTE-A low frequency operation mode and the LTE-A middle frequency operation mode. Curve 72 illustrates a scattering parameter when the antenna structure 100 works at the LTE-A high frequency operation mode. Curve 73 illustrates an isolation between the radiating portion A1 and the radiator 15.

Figure 8:
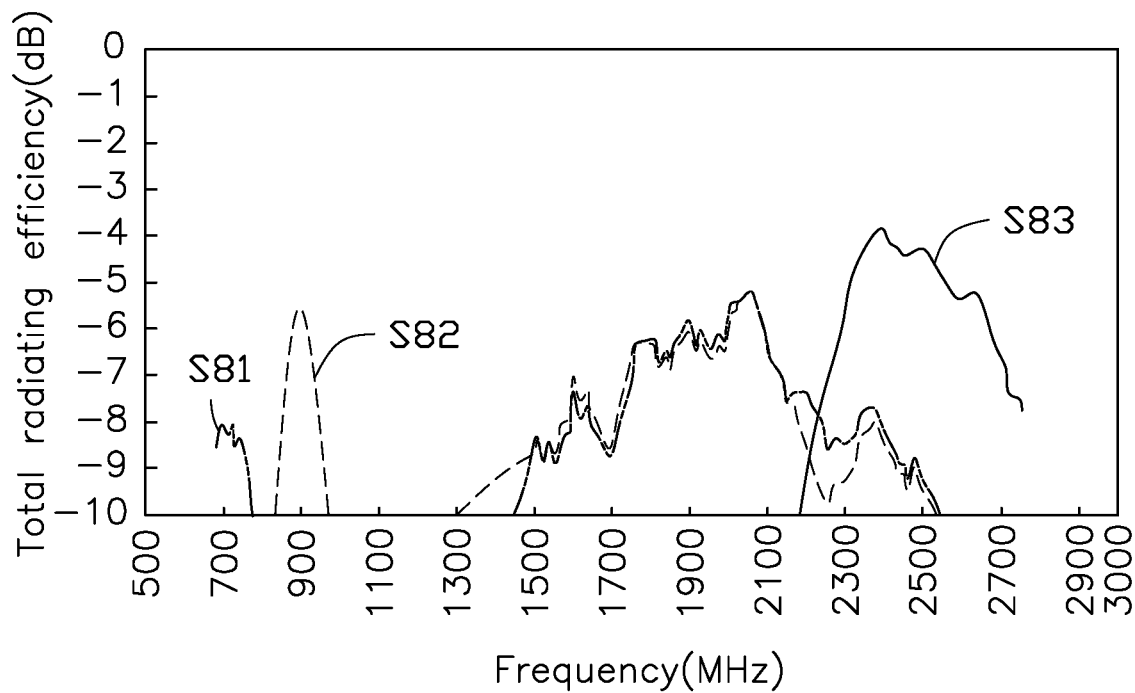
FIG. 8 is a total radiating efficiency graph of the antenna structure of FIG. 1.

FIG. 8 illustrates a total radiating efficiency of the antenna structure 100. Curves S81 and S82 illustrate total radiation efficiencies of the radiating portions A1 when the switching unit 171 of the switching circuit 17 switches to different switching elements 173. Curve S83 illustrates a total radiating efficiency when the antenna structure 100 works at the LTE-A high frequency operation mode.

As described above, the antenna structure 100 defines the first gap 121, the second gap 122, and the groove 123. Then a radiating portion A1 and a coupling portion A2 can be divided from the housing 11. The antenna structure 100 further includes a radiator 15. The radiating portion A1 activates a first operation mode and a second operation mode to generate radiation signals in LTE-A low and middle frequency bands. The radiator 15 can be coupled with the coupling portion A2 to activate a third operation mode to generate radiation signals in LTE-A high frequency band. Then the wireless communication device 200 can use carrier aggregation (CA) technology of LTE-A to receive or send wireless signals at multiple frequency bands simultaneously. In detail, the wireless communication device 200 can use the CA technology and use the radiating portion A1, the coupling portion A2, and the radiator 15 to receive or send wireless signals at multiple frequency bands simultaneously, that is, can realize 3CA simultaneously.

As described above, the antenna structure 100 includes the housing 11. The through hole 118, the slot 120, the first gap 121, the second gap 122, and the groove 123 of the housing 11 are all defined on the front frame 111 and the side frame 113 instead of on the backboard 112. Then only the front frame 111, the side frame 113, and the corresponding inner radiators (i.e., the radiator 15) may cooperatively form corresponding LTE-A Low, middle and high frequency antennas, which covers a wide band. In addition, the backboard 112 forms an all-metal structure. That is, the backboard 112 does not define any other slot and/or gap and has a good structural integrity and an aesthetic quality.

The embodiments shown and described above are only examples. Many details are often found in the art such as the other features of the antenna structure and the wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
a housing, the housing comprising a front frame, a backboard, and a side frame, the side frame positioned between the front frame and the backboard, the side frame defining a slot, the front frame defining a first gap, a second gap, and a groove, the first gap, the second gap, and the groove all communicating with the slot and extending across the front frame, a radiating portion and a coupling portion being divided from the housing and being separated from each other by the slot, the first gap, the second gap, and the groove, the radiating portion and the coupling portion both being formed by a portion of the housing;
a first feed source, the first feed source electrically connected to the radiating portion;
a ground portion spaced apart from the first feed source, one end of the ground portion electrically connected to the radiating portion and another end of the ground portion being directly grounded;
a radiator, the radiator positioned in the housing, being coupled with and apart from the coupling portion; and
a second feed source, the second feed source electrically connected to the radiator;
wherein a current from the second feed source is coupled to the coupling portion through the radiator; and
wherein when the second feed source supplies current, the current flows to the radiator and is coupled to the coupling portion to activate a third operation mode for generating radiation signals in a third frequency band.

2. The antenna structure of claim 1, wherein the side frame comprises an end portion, a first side portion, and a second side portion, the first side portion and the second side portion connect to two ends of the end portion; wherein the slot is defined on at least the end portion, the first gap communicates with a first end of the slot positioned on the first side portion, the second gap communicates with a second end of the slot positioned on the second side portion, the groove is positioned between the first end and the second end, and communicates with the slot; wherein a first portion of the front frame between the first gap and the groove forms the radiating portion, a second portion of the front frame between the second gap and the groove forms the coupling portion, and the coupling portion is grounded.

3. The antenna structure of claim 2, wherein the first feed source is electrically connected to the radiating portion so that the first feed source divides the radiating portion into a first radiating section and a second radiating section; wherein a first portion of the front frame extending from the first feed source to the first gap forms the first radiating section, a second portion of the front frame extending from the first feed source to the groove forms the second radiating section; wherein the ground portion is positioned between the first gap and the first feed source, and is electrically connected to the first radiating section.

4. The antenna structure of claim 3, wherein when the first feed source supplies current, the current flows to the first radiating section and is grounded through the ground portion to activate a first operation mode for generating radiation signals in a first frequency band; wherein when the first feed source supplies the current, the current further flows to the second radiating section to activate a second operation mode for generating radiation signals in a second frequency band.

5. The antenna structure of claim 4, wherein frequencies of the third frequency band are higher than frequencies of the first frequency band, and the frequencies of the first frequency band are higher than frequencies of the second frequency band.

6. The antenna structure of claim 4, wherein through adjusting a length of the radiator, the frequencies of the third frequency band are effectively adjusted; wherein through adjusting a distance between the radiator and the coupling portion, a bandwidth of the third frequency band is adjusted; wherein through adjusting positions of the ground portion and the first feeding source, the frequencies of the second frequency band are effectively adjusted; and wherein through changing a length of the ground portion, the frequencies and an impedance matching of the second frequency band are adjusted.

7. The antenna structure of claim 4, further comprising a switching circuit, wherein the switching circuit comprises a switching unit and a plurality of switching elements, the switching unit is electrically connected to the second radiating section, the switching elements are connected in parallel to each other, one end of each switching element is electrically connected to the switching unit, and the other end of each switching element is grounded; wherein through controlling the switching unit to switch, the switching unit is switched to different switching elements and the frequencies of the second frequency band are adjusted.

8. The antenna structure of claim 1, wherein the slot, the first gap, the second gap, and the groove are all filled with insulating material.

9. The antenna structure of claim 1, wherein a wireless communication device uses the radiating portion, coupling portion, and the radiator to receive or send wireless signals at multiple frequency bands simultaneously through carrier aggregation (CA) technology of Long Term Evolution Advanced (LTE-A).

10. A wireless communication device comprising:
an antenna structure, the antenna structure comprising:
a housing, the housing comprising a front frame, a backboard, and a side frame, the side frame positioned between the front frame and the backboard, the side frame defining a slot, the front frame defining a first gap, a second gap, and a groove, the first gap, the second gap, and the groove all communicating with the slot and extending across the front frame, a radiating portion and a coupling portion being divided from the housing and being separated from each other by the slot, the first gap, the second gap, and the groove, the radiating portion and the coupling portion both being formed by a portion of the housing;
a first feed source, the first feed source electrically connected to the radiating portion;
a ground portion spaced apart from the first feed source, one end of the ground portion electrically connected to the radiating portion and another end of the ground portion being directly grounded;
a radiator, the radiator positioned in the housing, being coupled with and apart from the coupling portion; and
a second feed source, the second feed source electrically connected to the radiator;
wherein a current from the second feed source is coupled to the coupling portion through the radiator; and
wherein when the second feed source supplies current, the current flows to the radiator and is coupled to the coupling portion to activate a third operation mode for generating radiation signals in a third frequency band.

11. The wireless communication device of claim 10, wherein the side frame comprises an end portion, a first side portion, and a second side portion, the first side portion and the second side portion connect to two ends of the end portion; wherein the slot is defined on at least the end portion, the first gap communicates with a first end of the slot positioned on the first side portion, the second gap communicates with a second end of the slot positioned on the second side portion, the groove is positioned between the first end and the second end, and communicates with the slot; wherein a first portion of the front frame between the first gap and the groove forms the radiating portion, a second portion of the front frame between the second gap and the groove forms the coupling portion, and the coupling portion is grounded.

12. The wireless communication device of claim 11, wherein the first feed source is electrically connected to the radiating portion so that the first feed source divides the radiating portion into a first radiating section and a second radiating section; wherein a first portion of the front frame extending from the first feed source to the first gap forms the first radiating section, a second portion of the front frame extending from the first feed source to the groove forms the second radiating section; wherein the ground portion is positioned between the first gap and the first feed source, and is electrically connected to the first radiating section.

13. The wireless communication device of claim 12, wherein when the first feed source supplies current, the current flows to the first radiating section and is grounded through the ground portion to activate a first operation mode for generating radiation signals in a first frequency band; wherein when the first feed source supplies the current, the current further flows to the second radiating section to activate a second operation mode for generating radiation signals in a second frequency band.

14. The wireless communication device of claim 13, wherein frequencies of the third frequency band are higher than frequencies of the first frequency band, and the frequencies of the first frequency band are higher than frequencies of the second frequency band.

15. The wireless communication device of claim 13, wherein through adjusting a length of the radiator, the frequencies of the third frequency band are effectively adjusted; wherein through adjusting a distance between the radiator and the coupling portion, a bandwidth of the third frequency band is adjusted; wherein through adjusting positions of the ground portion and the first feeding source, the frequencies of the second frequency band are effectively adjusted; and wherein through changing a length of the ground portion, the frequencies and an impedance matching of the second frequency band are adjusted.

16. The wireless communication device of claim 13, wherein the antenna structure further comprises a switching circuit, the switching circuit comprises a switching unit and a plurality of switching elements, the switching unit is electrically connected to the second radiating section, the switching elements are connected in parallel to each other, one end of each switching element is electrically connected to the switching unit, and the other end of each switching element is grounded; wherein through controlling the switching unit to switch, the switching unit is switched to different switching elements and the frequencies of the second frequency band are adjusted.

17. The wireless communication device of claim 10, wherein the slot, the first gap, the second gap, and the groove are all filled with insulating material.

18. The wireless communication device of claim 10, wherein the wireless communication device uses the radiating portion, coupling portion, and the radiator to receive or send wireless signals at multiple frequency bands simultaneously through carrier aggregation (CA) technology of Long Term Evolution Advanced (LTE-A).

* * * * *